United States Patent
Blanchard et al.

(10) Patent No.: US 8,486,851 B2
(45) Date of Patent: Jul. 16, 2013

(54) PROCESS FOR MANUFACTURING A CERAMIC COMPOSITE BASED ON SILICON NITRIDE AND β-EUCRYPTITE

(75) Inventors: Laurent Blanchard, Mouans-Sartoux (FR); Gilbert Fantozzi, Meyzieu (FR); Aurélien Pelletant, Villeurbanne (FR); Helen Reveron, Lyons (FR); Jérôme Chevalier, Rillieux la Pape (FR); Yann Vitupier, Mougins (FR)

(73) Assignee: Thales, Neuilly-sur-Seine (FR)

( * ) Notice: Subject to any disclaimer, the term of this patent is extended or adjusted under 35 U.S.C. 154(b) by 80 days.

(21) Appl. No.: 13/096,798

(22) Filed: Apr. 28, 2011

(65) Prior Publication Data

US 2012/0115707 A1    May 10, 2012

(30) Foreign Application Priority Data

Apr. 30, 2010    (FR) ...................................... 10 01865

(51) Int. Cl.
*C04B 35/596* (2006.01)
*C04B 35/19* (2006.01)

(52) U.S. Cl.
USPC ........................... 501/97.1; 501/97.4; 501/128

(58) Field of Classification Search
USPC ...................... 501/97.1, 97.2, 97.3, 97.4, 128
See application file for complete search history.

(56) References Cited

U.S. PATENT DOCUMENTS

| | | | | |
|---|---|---|---|---|
| 4,590,053 | A | * | 5/1986 | Hashimoto et al. ............ 423/344 |
| 7,112,549 | B2 | * | 9/2006 | Yoshitomi et al. ............. 501/128 |
| 2003/0100434 | A1 | * | 5/2003 | Yoshitomi et al. ............... 501/87 |

FOREIGN PATENT DOCUMENTS

| | | | |
|---|---|---|---|
| JP | 60122708 | * | 7/1985 |
| JP | 2001-302339 A | | 10/2001 |
| JP | 2001302338 | * | 10/2001 |
| JP | 2001302340 | * | 10/2001 |
| JP | 2003-292371 A | | 10/2003 |
| JP | 2004292249 | * | 10/2004 |

* cited by examiner

*Primary Examiner* — Karl Group
(74) *Attorney, Agent, or Firm* — Baker & Hostetler LLP

(57) ABSTRACT

A process for manufacturing a sintered ceramic composite, based on silicon nitride and β-eucryptite, includes a step of producing a first powder blend, consisting of a powder of silicon nitride in crystalline form and a powder of a first lithium aluminosilicate in crystalline form, the composition of which is the following: $(Li_2O)_x(Al_2O_3)_y(SiO_2)_z$, the lithium aluminosilicate composition being such that the set of molar fractions (x,y,z) is different from the set (1,1,2).

13 Claims, 2 Drawing Sheets

Figure 1:
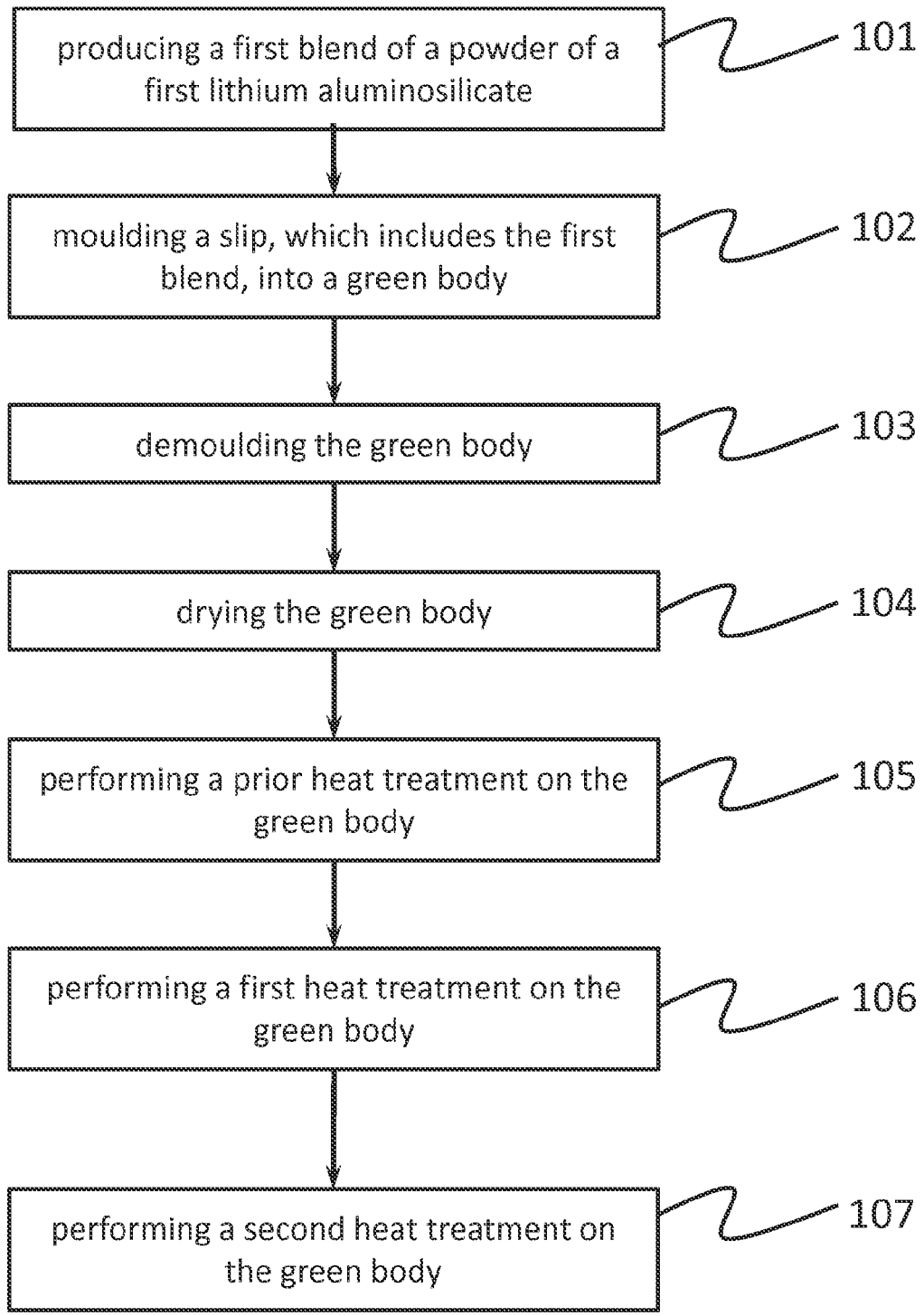

PROCESS FOR MANUFACTURING A CERAMIC COMPOSITE BASED ON SILICON NITRIDE AND β-EUCRYPTITE

CROSS-REFERENCE TO RELATED APPLICATION

This application claims priority to foreign French patent application No. FR 1001865, filed on Apr. 30, 2010, the disclosure of which is incorporated by reference in its entirety.

FIELD OF THE INVENTION

The field of the invention is that of designing materials suitable for producing optical components for space applications, such as mirrors, and for producing optical structures (also called structural components), the function of which is to position and support the optical components.

BACKGROUND

The general trend in space observation is to increase the diameter of mirrors, both for future scientific missions for observing the universe and for observing Earth from for example a geostationary orbit. Thus, in the near future, there will be a need for extremely stable materials which allow a high degree of lightening to be achieved, while still being rigid and strong, and which will enable mirrors to be produced with a diameter greater than 2 m and with a mass per unit area of less than 25 kg/m². To obtain dimensionally stable mirrors, materials having a very low CTE (coefficient of thermal expansion) are sought.

Optical structures, such as telescope structures, are also subject to very strict requirements in terms of dimensional stability so as to be able to guarantee the image quality and notably to preserve the alignments made on the ground between the optical components during firing and throughout the mission. In addition, their increasing dimensions require materials permitting a high level of lightening to be achieved while still being rigid and strong.

More particularly, the aim is to obtain materials having a coefficient of thermal expansion and mechanical properties suitable for optical applications in the space field. The expression "coefficient of thermal expansion suitable for space applications" is understood to mean a coefficient of thermal expansion of less than $1.3 \times 10^{-6} K^{-1}$ around the ambient temperature and/or at low temperatures (T<150 K). The expression "material having mechanical properties suitable for aerospace applications" is understood to mean a material having a high Young's modulus, i.e. greater than 100 GPa, and a high measured flexural strength, i.e. greater than 100 MPa.

Silicon nitride ($Si_3N_4$) is a very good candidate for these applications as it has good mechanical properties. Notably, it has a high Young's modulus, equal to about 320 GPa, and a high measured flexural strength, i.e. greater than 700 MPa. However, silicon nitride has a non-zero, slightly positive, coefficient of thermal expansion.

β-eucryptite is a lithium aluminosilicate widely referred to by the acronym LAS, the composition of which is the following: $(Li_2O)_x(Al_2O_3)_y(SiO_2)_z$, in which x, y and z are the respective molar fractions of lithium oxide $Li_2O$, alumina $Al_2O_3$ and silica $SiO_2$. The respective molar fractions of β-eucryptite are the following: x=1, y=1 and z=2.

β-eucryptite has the particular feature of having a highly negative coefficient of thermal expansion, that is to say it contracts when the temperature is raised. The coefficient of thermal expansion of a nanoscale or micron-size polycrystal of β-eucryptite is around $-8 \times 10^{-6} K^{-1}$ (K corresponding to degrees Kelvin). When the β-eucryptite is incorporated into a silicon nitride matrix it has a tendency to lower the coefficient of expansion of the composite thus produced.

A process for manufacturing a sintered ceramic composite that includes a step of blending β-eucryptite and silicon nitride powders in an aqueous or alcoholic solution is known. The blend is then heated to a temperature for sintering the silicon nitride.

The Applicant has found, without disclosing this, that it is not possible to obtain, from this known process, a composite having dimensional stability and mechanical properties suitable for optical applications in the space field. Specifically, it is possible to obtain, from the known process, a material having a coefficient of expansion suitable for space applications from a silicon nitride/β-eucryptite blend only if the blend has a β-eucryptite mass proportion at least equal to 60%. Now, β-eucryptite, which has a Young's modulus of around 70 GPa, lowers the mechanical properties of the composite in relation to those of the silicon nitride. The composite obtained has mechanical properties incompatible with optical applications in the space field.

SUMMARY OF THE INVENTION

The present invention provides a process for manufacturing a sintered ceramic composite of dimensional stability compatible with space applications and good mechanical properties enabling large optical components and structures to be produced.

The Applicant has found that while a silicon nitride matrix in which crystalline β-eucryptite particles are dispersed is being sintered reactions occur between the silica and the silicon nitride. These reactions form silicon oxinitrides, which have the effect of modifying the composition of the β-eucryptite. The composite obtained contains not only just β-eucryptite but also lithium aluminosilicate (LAS) differing from β-eucryptite. A lithium aluminosilicate having the composition $(Li_2O)_x(Al_2O_3)_y(SiO_2)_z$ differs from β-eucryptite when the set of molar fractions (x,y,z) is different from (1,1,2). Now, a lithium aluminosilicate has a very negative coefficient of thermal expansion only when its composition is that of β-eucryptite. Thus, the process of the prior art makes it possible to obtain a coefficient of thermal expansion as low as desired only using a large amount of β-eucryptite.

The Applicant has also found that while a silicon nitride matrix in which crystalline β-eucryptite particles are dispersed is being sintered, melting of the β-eucryptite particles takes place. After cooling down, the β-eucryptite obtained is therefore in amorphous form. Now, β-eucryptite in amorphous form has a higher coefficient of thermal expansion than when in its crystalline form.

Thus, the subject of the invention is a process for manufacturing a sintered ceramic composite, based on silicon nitride and β-eucryptite, which includes a step of producing a first powder blend, consisting of a powder of silicon nitride in crystalline form and a powder of a first lithium aluminosilicate in crystalline form, the composition of which is the following: $(Li_2O)_x(Al_2O_3)_y(SiO_2)_z$, characterized in that the lithium aluminosilicate composition is such that the set of molar fractions (x,y,z) is different from the set (1,1,2).

According to one embodiment of the invention, the process includes a first heat treatment on a composite consisting of silicon nitride and the first lithium aluminosilicate obtained from the first blend, in order to sinter the silicon nitride and obtain a ceramic composite based on silicon nitride and β-eucryptite.

According to one embodiment of the invention, the first heat treatment is carried out at a first temperature above the melting point of β-eucryptite under the operating conditions of the first heat treatment.

According to one embodiment of the invention, the process includes, after the first heat treatment a second heat treatment to crystallize the β-eucryptite.

According to one embodiment of the invention, the second heat treatment is carried out by heating the ceramic composite based on silicon nitride and β-eucryptite to at least a temperature between 500° C. and 800° C. and maintaining it at said temperature.

According to one embodiment of the invention, the second heat treatment includes a nucleation step at a nucleation temperature and a growth step at a growth temperature above the nucleation temperature.

According to one embodiment of the invention, the second heat treatment is carried out after the ceramic composite obtained after sintering has been left to cool down.

According to one embodiment of the invention, the process includes, prior to the step of blending the silicon nitride powder with the first lithium aluminosilicate, a step of washing a first silicon nitride powder in order to remove the silica contaminating the first silicon nitride powder.

According to one embodiment of the invention, the process includes a step of manufacturing a powder of the first lithium aluminosilicate, which includes:

a step of producing a powder blend of lithium carbonate, alumina and silica in suitable proportions in order to obtain the first lithium aluminosilicate; and a step of calcining a powder resulting from said blend in order to obtain the first lithium aluminosilicate.

According to one embodiment of the invention, the calcining step comprises a step of raising the temperature up to a maximum temperature followed by a step of reducing the temperature starting as soon as the temperature has reached the maximum temperature.

According to one embodiment of the invention, the crystals of the silicon nitride powder are of nanoscale or micron size and the crystals of the first lithium aluminosilicate powder are of nanoscale or micron size.

The process according to the invention enables a sintered composite based on β-eucryptite to be obtained, and not one based on an LAS different from the β-eucryptite. Thus, it is possible to obtain composites having a very low coefficient of expansion, or even a zero coefficient of expansion, and also having mechanical properties compatible with optical applications in the space field.

BRIEF LIST OF THE DRAWINGS

Figure 2:
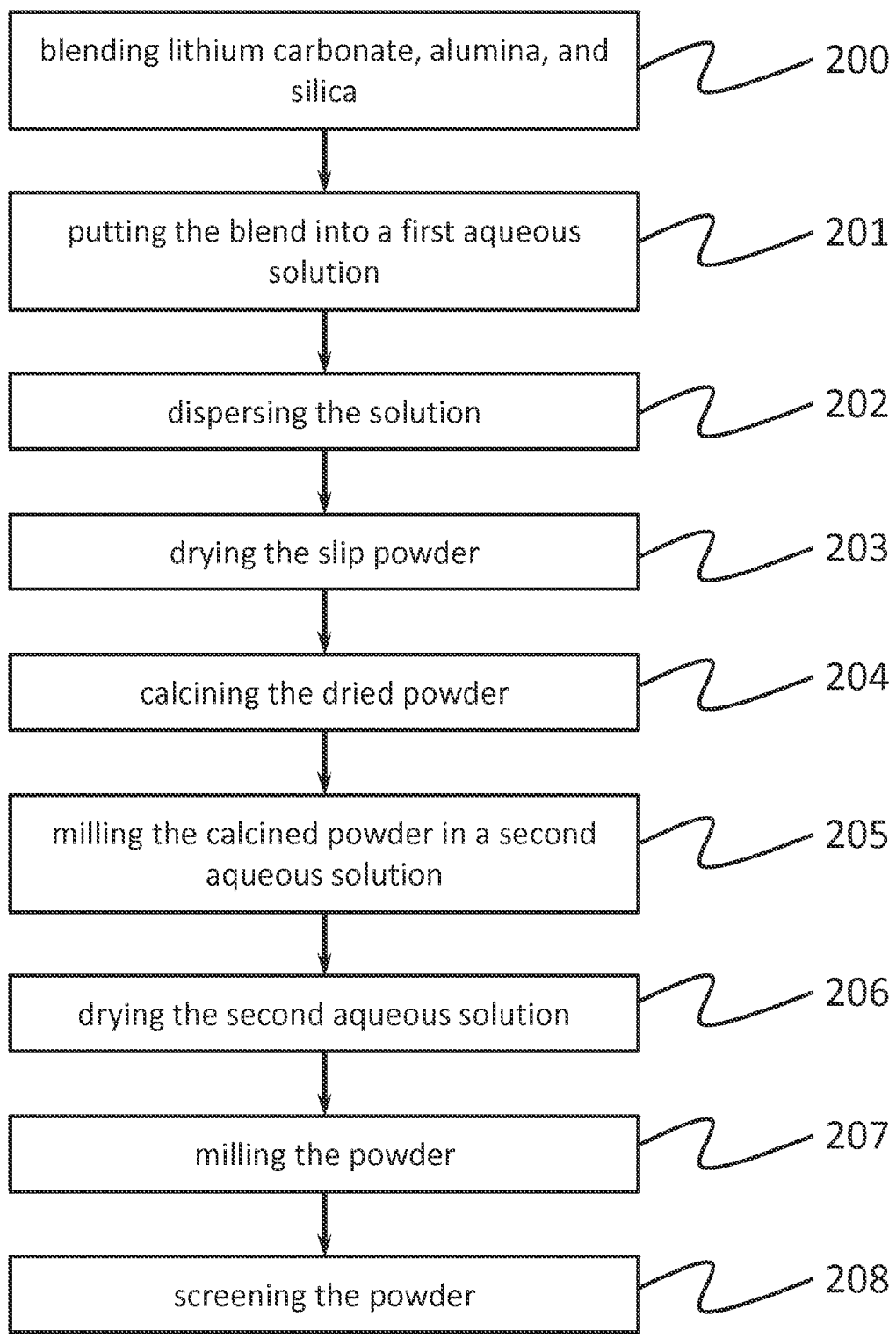

Other features and advantages of the invention will become apparent on reading the following detailed description, given by way of non-limiting example and with reference to the appended drawings in which:

FIG. 1 is a flow chart representing the steps of the process according to the invention; and FIG. 2 is a flow chart representing the steps of an example of a process for synthesizing an LAS used in the process according to the invention.

In both figures, identical elements are identified by the same references.

DETAILED DESCRIPTION

The steps of the process for manufacturing a ceramic composite based on sintered silicon nitride and β-eucryptite according to the invention are shown in FIG. 1.

The process according to the invention includes a step of producing, in solution at 101, a first blend of a powder of a first lithium aluminosilicate LAS in the crystalline state, the composition of which differs from that of β-eucryptite, with a silicon nitride powder in crystalline form together with optional additives. The first blend is for example produced as an aqueous or alcoholic dispersion.

It is preferred to use powders having nanoscale or micron size LAS and silicon nitride particles.

By adding small amounts of LAS relative to the amount of silicon nitride, mechanical properties close to those of silicon nitride are maintained.

Optionally, additives such as sintering aids, for example of the $Al_2O_3+Y_2O_3$, $Y_2O_3+MgO$, $Li_2O-Y_2O_3$, MgO, or $Y_2O_3$ type, may be used.

The blending step is for example a dispersion step. This step enables the first LAS to be dispersed and is, for example, carried out by passing the first blend in a rotary ball mill. The slip thus obtained is then moulded at 102. Thus, it is possible to produce various shapes such as tubes or simple plates by choosing a suitable mould shape.

The composite obtained is dried at 104. The drying is for example carried out in an oven. Advantageously, the drying step is carried out after the part has been demoulded at 103.

As a variant, the slip obtained in step 101 is dried (for example by spray drying and granulation, addition of binders and plasticizers) and then pressed using a cold or hot pressing method.

As a variant, the blend is not produced in solution but as a dry blend, for example in a rotary ball mill, and then pressed using a cold or hot pressing method.

At this stage, the part obtained by casting or cold pressing may be machined so as to give it a complex geometry. For example, it is possible to make cavities within the green body, so as to lighten the part.

A prior heat treatment at 105 is advantageously carried out so as to remove the binder from the green body, that is to say eliminate the organic binder used for obtaining good powder compacting, at a prior temperature Tp for a time Dp.

The prior heat treatment at 105 consists, for example, in heating the part to a temperature of 600° C. and holding it at this temperature for one hour. The temperature rise and/or the temperature fall proceeds for example at 1° C./min.

The silicon nitride is then sintered at 106 by carrying out a first heat treatment on the first composite obtained, which is based on silicon nitride and the first aluminosilicate. The first heat treatment consists in heating the first composite to a first temperature T1 and holding it there for a first time D1. The temperature rise is optionally carried out with the assistance of a gas pressure or mechanical pressure. The first heat treatment is advantageously carried out in an inert atmosphere or in a vacuum.

The temperature may be raised by radiative or pulsed-current or microwave heating. The first temperature T1 is chosen for sintering the silicon nitride. The first temperature T1 is above the melting point of β-eucryptite under the operating conditions (pressure, rate of temperature rise, current, hold time at the sintering temperature). As an example, since the melting point of β-eucryptite is around 1340° C. under natural sintering conditions, the sintering temperature is for example above 1340° C. The temperature T1 is applied for a time of for example between 0 h and 12 h.

During the sintering at 106, reactions occur between the silica contained in the first lithium aluminosilicate and the silicon nitrite.

To counter this effect, the composition of the first lithium aluminosilicate is chosen with an excess or a deficit of silica relative to the β-eucryptite composition so that this excess or deficit corresponds precisely to the amount of silica that reacts with the silicon nitride during sintering. The choice of composition, whether with an excess amount or a deficit amount of silica, depends on the silica composition of the starting silicon nitride powder. Thus, after sintering at 106, a sintered ceramic composite based on silicon nitride and β-eucryptite is obtained. A first lithium aluminosilicate having a deficit of silica in relation to β-eucryptite is provided in the case in which the amount of silica present in the silicon nitride powder is higher than that which reacts during sintering. An excess amount of silica is provided when the amount of silica present in the silicon nitride powder is lower than that which reacts during sintering.

It is also possible, prior to step 101 of blending the silicon nitride with the first LAS, to wash the first silicon nitride powder so as to eliminate the surface silica layer that conventionally contaminates silicon nitride powders. What is obtained is the silicon nitride powder blended at 101 with the first lithium aluminosilicate. The washing is for example carried out using acid, for example hydrofluoric acid, hydrochloric acid or a mixture of acids. Assuming that after the washing step the silicon nitride no longer contains silica, it suffices to adjust the composition of the first lithium aluminosilicate with a slight excess of silica in relation to the β-eucryptite, the excess corresponding to the amount of silica that reacts with the silicon nitride. By carrying out this prior washing step, the composition of the first LAS is easier to adjust as it is not necessary to determine the amount of silica present within the silicon nitride. It is therefore necessary to compensate only for the proportion of silica that reacts with the silicon nitride.

The larger the size of the silicon nitride crystals, the higher the temperature for sintering this material. To lower the first temperature T1 as far as possible, it may be advantageous to use nanoscale silicon nitride powders. This also reduces the magnitude of the reaction between the silica and the silicon nitride.

The melting point of β-eucryptite is between 1340° C. and 1380° C. Step 106 of sintering the silicon nitride causes the β-eucryptite to melt. The melting of the β-eucryptite enables the silicon nitride to be sintered in the liquid phase. However, when molten β-eucryptite cools down, it remains amorphous and does not have a coefficient of thermal expansion in the amorphous state as low as that in the crystalline state.

To improve the dimensional stability of the sintered ceramic composite obtained upon sintering the silicon nitride (i.e. to lower its coefficient of thermal expansion), a second heat treatment at 107 is advantageously provided so as to crystallize all or part of the β-eucryptite. This heat treatment is carried out on the ceramic composite obtained after sintering by heating to at least a second temperature T2, advantageously between 500° C. and 800° C., and maintaining it thereat. These temperatures are determined by differential thermal analysis of the LAS glassy phase obtained by melting and quenching the δ-eucryptite with molar fractions x=1, y=1 and z=2.

This second treatment at 107 makes it possible to obtain β-eucryptite predominantly in crystalline form, having a negative coefficient of thermal expansion. This step enables the coefficient of thermal expansion of the ceramic composite to be lowered. A composite which is a crystalline ceramic based on silicon nitride and β-eucryptite is obtained. The relative proportions of silicon nitride and β-eucryptite in the composite determine the coefficient of thermal expansion. The larger the amount and the higher the degree of crystallinity of the β-eucryptite, the lower the coefficient of thermal expansion of the composite. Since the crystallization step makes it possible to obtain β-eucryptite predominantly in crystalline form, it limits the amount of LAS needed in the initial blend to obtain a composite having a low coefficient of thermal expansion and thus to obtain a composite having mechanical properties compatible with optical applications in the space field. Advantageously, the proportion by weight of LAS in the initial blend is between 0% and 25%, preferably between 10% et 15%.

The second heat treatment at 107 is advantageously carried out after the part has been left to cool down following the sintering at 106.

The second heat treatment at 107 comprises, for example, a nucleation phase at a nucleation temperature of between 600° C. and 680° C., for example 640° C., for a certain nucleation time. The nucleation time is between 0 h and 10 h and is, for example equal to about 2 h. The nucleation phase is advantageously followed by a nuclei growth phase. The nuclei growth phase is carried out at a growth temperature between 680° C. and 720° C., for example at 690° C., for a certain growth time. For example, the growth time is equal to about 10 h.

The crystallization treatment makes it possible to obtain crystalline β-eucryptite in a sintered silicon nitride even though the melting point of β-eucryptite is below the silicon nitride sintering temperature.

Advantageously, the part obtained may then be machined and ground, or even polished in the case of a mirror.

What is finally obtained is a composite having a coefficient of expansion lower that that of the original silicon nitride, which coefficient may be precisely adjusted as a function of the volume ratio between the first LAS and the silicon nitride but also by the duration of the second heat treatment that determines the degree of crystallinity of the β-eucryptite particles.

To improve the thermal conduction properties of this composite, it is conceivable to provide a step of adding further particles, such as for example carbon nanotubes. This addition is carried out during the step 101 of blending the silicon nitride with the β-eucryptite.

FIG. 2 shows the steps of an example of a process for synthesizing the first lithium aluminosilicate LAS. The LAS may of course be obtained by any other process enabling a nanoscale or micron-size LAS to be synthesized.

Lithium carbonate $Li_2CO_3$, alumina $Al_2O_3$ and silica $SiO_2$ powders are blended at 200 in proportions suitable for obtaining the first lithium aluminosilicate. This blend is produced with an excess amount or a deficit of silica in relation to the proportions necessary for obtaining β-eucryptite.

The blend obtained is put into aqueous solution at 201, for example containing 50% by weight of the blend. Optionally, a dispersing agent, for example a polyacrylate, may be introduced into the solution.

For example, a solution is produced in which 50% of the weight thereof results from the previously obtained blend and 0.15% of the weight corresponds to a dispersing agent. The solution is then dispersed at 202. The dispersing step is, for example, carried out by means of a rotary ball mill with zirconia balls for 24 h.

The slip obtained is then dried at 203. The drying operation is for example carried out in an oven at 110° C. This operation is continued until the weight loss is zero.

The process then includes a step 204 of calcining the dried powder at a maximum temperature. The function of the calcining step is to create the conditions for obtaining a solid-state reaction between the lithium carbonate $Li_2CO_3$, alumina $Al_2O_3$ and silica $SiO_2$ powders so as to obtain the first LAS. Advantageously, the calcining step comprises a step of raising the temperature up to a maximum temperature $T_{max}$ followed by a step of lowering the temperature starting as soon as the maximum temperature is reached. In other words, the hold time at the maximum temperature is zero. The Applicant has found that the absence of a temperature hold at $T_{max}$ prevents the first LAS obtained from densifying or sintering, something which is not the case when the powder is held at the maximum temperature for a long time. As a variant, the calcination may be carried out up to a maximum temperature $T_{max}$ with a hold at the temperature for a predetermined time if it is desired to use a β-eucryptite of larger size. The longer the hold time, the greater the densification.

For example, the dried powder is calcined in a furnace according to the following protocol: temperature rise to 1050° C. at a rate of 5° C./min, and then, as soon as this temperature is reached, cooling at a rate of 5° C./min down to 200° C. and natural cooling.

The calcined powder is then milled at 205 in aqueous solution in order to obtain nanoscale or micron-size particles. Milling is carried out for example in an attrition mill.

For example, an aqueous solution having a solids content of 40% by weight is obtained. The aqueous solution is then milled in an attrition mill for 6 h at 500 revolutions per minute.

The solution is then dried at 206.

The drying is carried out for example by means of a rotary evaporator at 70° C. under a pressure of 300 mbar.

Finally, the LAS powder is milled at 207 and screened at 208.

The invention claimed is:

1. A process for manufacturing a ceramic composite, based on silicon nitride and β-eucryptite, comprising:
   producing a first powder blend including
      a powder of silicon nitride in crystalline form, and
      a powder of a first lithium aluminosilicate in crystalline form,
   wherein a composition of the first lithium aluminosilicate is $(Li_2O)_x (Al_2O)_y (SiO_2)_z$, such that a set of the molar fractions (x,y,z) is different from the set (1,1,2), and
   wherein a proportion of the first lithium aluminosilicate in the first powder blend is not greater than 25% by weight.

2. The process according to claim 1 further comprising a first heat treatment on a composite consisting of the silicon nitride and the first lithium aluminosilicate obtained from the first powder blend, in order to sinter the silicon nitride and obtain the ceramic composite based on silicon nitride and β-eucryptite.

3. The process according to claim 2, wherein the first heat treatment is carried out at a first temperature above a melting point of β-eucryptite under operating conditions of the first heat treatment.

4. The process according to claim 2, further comprising, after the first heat second heat treatment to crystallize the β-eucryptite.

5. The process according to claim 4, wherein the second heat treatment is carried out by heating the ceramic composite based on silicon nitride and β-eucryptite to a temperature of at least 500° C. and maintaining the ceramic composite based on silicon nitride and β-eucryptite at said temperature of at least 500° C.

6. The process according to claim 4, wherein the second heat treatment includes a nucleation step at a nucleation temperature and a growth step at a growth temperature above the nucleation temperature.

7. The process according to claim 1, further comprising, prior to the producing the first powder blend, washing a first silicon nitride powder in order to remove silica contaminating the first silicon nitride powder.

8. The process according to claim 1, further comprising manufacturing the powder of the first lithium aluminosilicate, including:
   producing a powder blend of lithium carbonate, alumina, and silica in suitable proportions to obtain the first lithium aluminosilicate; and
   calcining a powder resulting from said powder blend to obtain the first powder of the lithium aluminosilicate.

9. The process according to claim 8, wherein the calcining step includes raising a temperature of the powder resulting from said powder blend up to a maximum temperature followed by a step of reducing the temperature of the powder resulting from said powder blend as soon as the temperature has reached the maximum temperature.

10. The process according to claim 1, wherein crystals of the silicon nitride powder are of nanoscale or micron size, and wherein crystals of the first lithium aluminosilicate powder are of nanoscale or micron size.

11. The process according to claim 1, wherein a proportion of the first lithium aluminosilicate in the first powder blend is between 10% and 15% by weight.

12. The process according to claim 8, wherein the powder blend of lithium carbonate, alumina, and silica has an excess amount of silica in relation to a proportion necessary for obtaining β-eucryptite.

13. The process according to claim 8, wherein the powder blend of lithium carbonate, alumina, and silica has a deficit of silica in relation to a proportion necessary for obtaining β-eucryptite.

* * * * *